Sept. 28, 1965 R. H. HANES 3,208,688

TAPE REEL

Filed March 11, 1963

INVENTOR
ROBERT H. HANES
BY Carpenter, Abbott, Coulter & Kinney
ATTORNEYS

United States Patent Office 3,208,688
Patented Sept. 28, 1965

3,208,688
TAPE REEL

Robert H. Hanes, Stillwater, Minn., assignor to Minnesota Mining and Manufacturing Company, St. Paul, Minn., a corporation of Delaware Filed Mar. 11, 1963, Ser. No. 264,338
4 Claims. (Cl. 242—74.2)

This invention relates to reels for storing tape, especially magnetic recording tape, and provides structure for easy releasable attachment of tape to the reel.

The inconvenience in threading magnetic recording tape to conventional reels is well known. Not only are the usual provisions awkward and time consuming, but they almost always involve a discontinuous tape wrapping surface which might cause damage to the tape from the surprisingly strong compressive forces sometimes exerted by the wound tape. Furthermore, conventional tape threading arrangements require openings in the reel flanges which not only weaken the reel but which permit dust and dirt to contaminate the tape. In video recording and data processing, dust is a serious problem, and, as a consequence, various bag or other type enclosures have heretofore been used for storing reels of tape. Dustproof reel units, comprising reels with solid flanges and band closures around the reel periphery, are a more simple approach to the dust problem, but their use necessitates new means for attaching tape to reels.

The above reasons have long provided incentive for easy-threading reels. Early attempts in motion picture film reels included flanges with tapered inner surfaces so that the film was transversely bowed at the hub and held in place due to the inherent springiness of the film (U.S. Patent No. 2,393,492). Other reels used springs along the inner flange surface (U.S. Patent No. 1,888,725), or catches (U.S. Patent No. 2,343,980). Most of these approaches relied on the strength and resilience of the film.

Such arrangements used with motion picture film are not suited to magnetic recording tape which is very limp and supple, extremely thin, and quite susceptible to damage. Most magnetic recording tapes now on the market are from 0.5 to about 1.5 mils in thickness compared to about 5 mils for ordinary motion picture film. Suggestions for easy threading of magnetic recording tape have accordingly followed different schemes, none of which has achieved commercial success. One such suggestion (U.S. Patent No. 2,753,127) is to use sponge rubber on the inner flange surface around the hub, the space between the flanges being reduced by the rubber to less than tape width, but this is impractical for a number of reasons.

The present invention provides an easy-thread reel for storing very thin, pliant tape of predetermined width. Reels embodying this invention may have solid flanges, and they are threaded more simply and quickly than conventional reels. It has been found, for example, that simply wrapping magnetic recording tape 90 degrees around the hub of a reel of this invention assures attachment of the tape to the reel.

A reel contemplated in this invention uses one or more light leaf springs disposed so that each spring has a flat, firm, nonconforming tape-engaging surface extending outwardly from the hub rim closely adjacent the inner surface of one flange, with the tape-engaging portion of the spring being flexible toward the flange surface. In the unflexed condition, the tape-engaging surface of the spring is raised slightly above the adjacent flange surface at the hub rim, spacing the spring surface and the surface of the opposite flange by slightly less than the width of the tape for which the reel is intended. From the hub rim, the flat tape-engaging surface tapers to lie flush with the flange surface at a point outwardly from the hub rim and is there spaced from the opposite flange surface a distance substantially greater than tape width. Only a light force is required to deflect the spring so that when the most flimsy magnetic recording tape is wound on the hub rim, the spring is deflected the amount of its interference with the tape. The flat, firm, nonconforming tape-engaging surface of the spring has a high coefficient of friction which, in cooperation with the spring tension acting on tape wrapped against the hub rim, holds the tape to the reel.

The present invention will be readily understood from the following description of a preferred embodiment in conjunction with the accompanying drawing in which.

Figures 1, 2, 3:
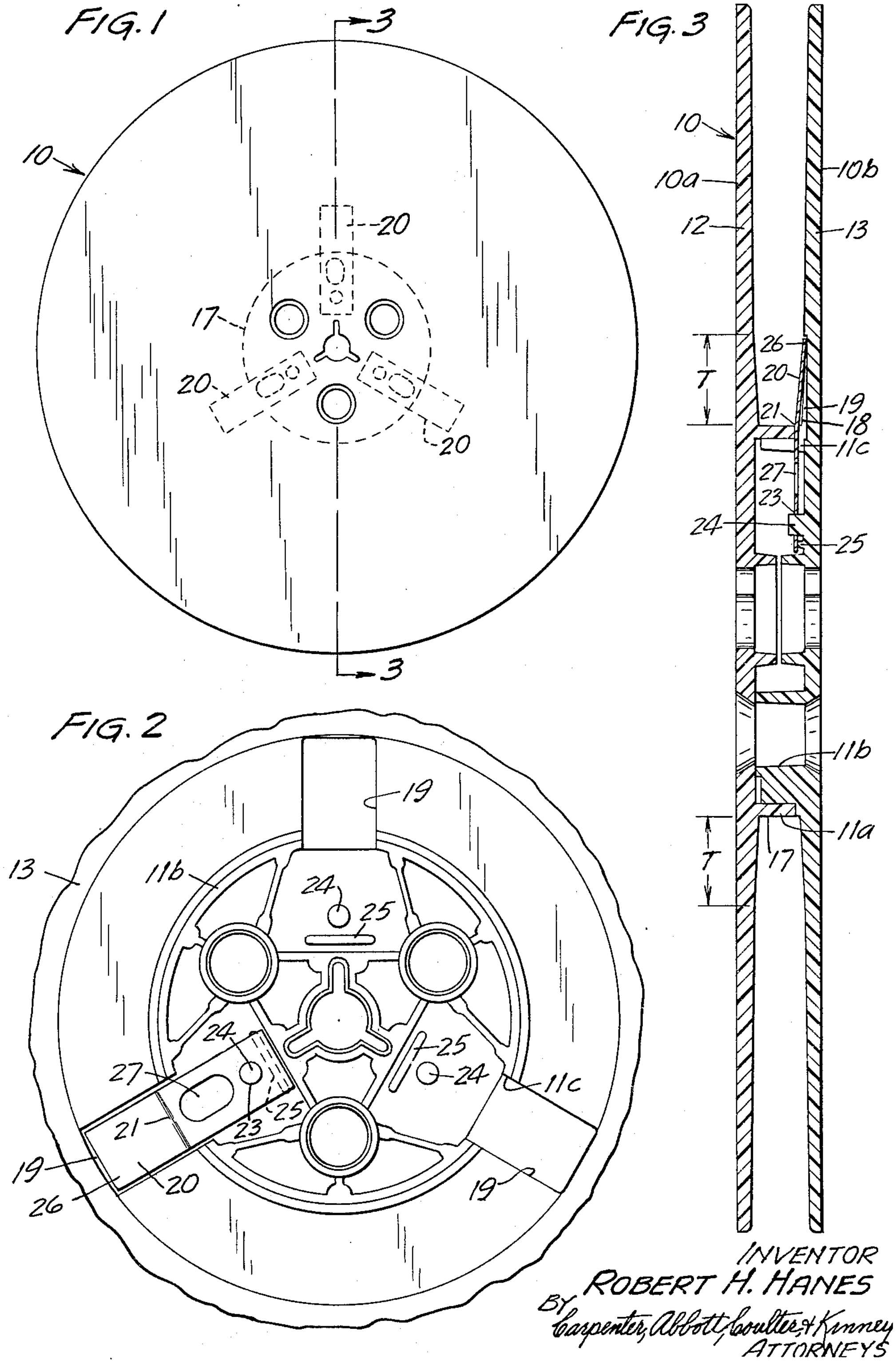
FIG. 1 is a plan view of a magnetic recording tape reel embodying the invention.
FIG. 2 is an enlarged plan view of a portion of the reel with the top half of the reel and two springs removed.
FIG. 3 is a section along the line 3—3 of FIG. 1.

The reel 10 has a hub 11 and two parallel, circular, continuous side flanges 12 and 13, and is made in sections 10*a* and 10*b*, each section including one of the flanges 12 and 13 and a part 11*a* or 11*b* of the hub. The two sections are of molded plastic such as polystyrene and are permanently bonded together by momentarily dipping the inner hub part 11*b* into a suitable solvent and then joining the two sections together.

The circumference of the outer hub part 11*a* provides a tape-receiving rim 17. The two flanges 12 and 13 taper toward one another adjacent the hub rim over an area T and at the hub rim 17 are spaced a distance equal to or slightly greater than the width of tape with which the reel is to be used. The outer hub part 11*a* is continuous, but circumferentially spaced around its edge, adjacent the inner surface of flange 13, are three slots 18, each coinciding with an outwardly extending recess 19 in the tapered part of flange 13 and an opening 11*c* in the inner hub part 11*b*. A thin elongated leaf spring 20 is disposed in each of the slots 18 and openings 11*c* and extends generally radially along the flange surface in the corresponding recess 19.

As shown in FIGURE 3, each spring 20 is bent slightly along a transverse line 21. Inside the hub an aperture 23 of the spring is fitted on a short upstanding tapered post 24, and one end of the spring rests on a boss 25. When the reel sections 10*a* and 10*b* are assembled, the hub rim 17 bears against the line of bending 21 to place the spring under a slight tension against the boss 25 at one end and the flange 13 at the other end, so that the spring is disposed at a taper from the hub rim 17 to a point 26 where its surface is substantially flush with the inner surface of the flange 13.

The springs 20 lie in the recesses 19 in the tapered area T of flange 13, but protrude above the tapered surface into the space between the flanges 12 and 13. The tape-engaging surface of the spring, which has a rubber coating (too thin to be illustrated), thus interferes with tape that is placed between the reel flanges and drawn down against the hub, where the tape is stiffened across its width by its contact with the hub surface. Since the spring is supported at its ends, it may be flexed toward the flange 13, and an interior aperture 27 in the spring increases flexibility. When magnetic recording tape is wound on the tape-receiving rim 17, the springs 20 deflect, permitting the convolutions to lie flat.

The pressure of the spring against an edge of the wrapped tape exerts a force on the tape that tends to hold it against sliding movement with respect to the reel. To insure positive gripping, the tape-engaging surface of the spring should have a high coefficient of friction in contact with common tape backings such as cellulose acetate and oriented polyethylene terephthalate. For example, coatings which are smooth, firm and non-conformable and which provide a coefficient of friction in contact with cellulose acetate of about 0.6 or more have been found to be useful. The combination of light spring action with a high friction surface holds the tape with surprising snugness, but without damage to the tape.

In the illustrated reel, which has a 7-inch overall diameter, the springs 20 are made from 4-mil type 302, spring temper stainless steel and are ⅜" wide. Over most of their area the flanges are spaced apart 0.32", but each flange tapers inwardly to a spacing at the hub rim of 0.250", the width of tape used with this specific reel. The tape engaging surface of the spring 20 is raised above the surface of flange 13 about 15 mils at the hub rim. The spring 20 is deflected the 15 mils of spring interference under a pressure of approximately 32 grams. The springs are coated with silicone rubber and have a coefficient of friction in contact with cellulose acetate of approximately 0.80–0.90.

The embodiment described is a preferred one, but certain other reel dimensions, spring tensions, and coefficients of friction also give good results. An acceptable range for interference by the spring with tape wrapped against the hub rim is 5–30 mils. The force needed to deflect the springs the distance they interfere with the wrapped tape preferably lies between 25–40 grams, but spring tensions in the range of 15–60 grams are useful, especially at the low end of this range for very thin tape and at the high end for relatively thick tape. The springs may be manufactured from other resilient materials such as beryllium copper and stainless steel.

The higher the coefficient of friction of the tape engaging surface with cellulose acetate, the more reliable has been the threading operation. Excellent results have been obtained at coefficients of friction between 0.7 and 1.0 and a coefficient as low as 0.60 is useful. Any long lasting treatment of the spring surface which provides a firm, nonconforming surface is suitable. For example, silicone rubber applied to the springs as a pressure-sensitive adhesive tape has been used with good success.

In attaching magnetic recording tape to a take-up reel of a tape recorder, the end of the tape to be threaded is laid between the flanges and pulled about 90 degrees or more around the hub rim. To eliminate the tail formed by the end of the tape, the supply reel may be counter-rotated, and the loose end will follow the path of tape to assume a position wrapped against the rim with as little as approximately 90 degrees of the rim circumference covered. The machine is now ready for operation and upon energizing, the tape is wound on the take-up reel with very little or no initial slippage.

Various other arrangements to support the springs are useful. In one construction, the three springs were made as integral legs extending from one central thin plate which was formed with a central aperture for the mounting spindle. The legs were bent in the same manner as the spring members 20 so that they extended slightly above one inner flange surface at the hub rim, and tapered outwardly from the rim to points substantially flush with the flange surface.

I claim:

1. A tape reel that upon rotation in a magnetic tape recorder self-threads magnetic recording tape that is from 0.5 to 1.5 mils in thickness and has a predetermined width, said reel comprising a hub having a cylindrical tape-receiving rim and first and second circular side flanges, the inner surfaces of which are spaced at the hub rim by a distance at least as great as said tape width and at all other points by a distance greater than the tape width, said hub rim being formed with at least one slot adjacent said first flange; and a spring means extending from within a said slot outwardly along the inner surface of said first flange, said spring means (1) having a firm nonconforming tape-engaging surface having a coefficient of friction in contact with cellulose acetate greater than about 0.6 and affording an interference of at least 5 mils with a said tape when wrapped on the hub rim, said spring being free to be deflected within its slot to a spacing from said second flange surface at least equal to the width of the tape when a said tape is wrapped on the hub rim, and (2) having a supple resiliency affording a resistance of at most about 60 grams to said deflection of the spring.

2. A tape reel that upon rotation in a magnetic tape recorder self-threads magnetic recording tape that is from 0.5 to 1.5 mils in thickness and has a predetermined width, said reel comprising a hub having a cylindrical tape-receiving rim and first and second circular side flanges, the inner surfaces of which are spaced at the hub rim by a distance at least as great as said tape width and at all other points by a distance greater than the tape width, said hub rim being formed with a plurality of slots adjacent said first flange, and the inner surface of said flange being formed with a recess extending outwardly from each of said slots; and a spring means mounted in the reel and extending from within each of said slots outwardly along said recess, each said spring means (1) having a firm nonconforming tape-engaging surface having a coefficient of friction in contact with cellulose acetate greater than about 0.6 and affording an interference of 5–30 mils with a said tape when wrapped on the hub rim, said tape-engaging surface at a point outwardly of the hub rim lying within a said recess and substantially flush with said first flange surface, and said spring being free to be deflected within its slot to a spacing from said second flange surface at least equal to the width of the tape when a said tape is wrapped on the hub rim, and (2) having a supple resiliency affording a resistance of at most about 60 grams to said deflection of the spring.

3. A tape reel that upon rotation in a magnetic tape recorder self-threads magnetic recording tape that is from 0.5 to 1.5 mils in thickness and has a predetermined width, said reel comprising a hub having a cylindrical tape-receiving rim and first and second circular side flanges, the inner surfaces of which are spaced at the hub rim by a distance approximately equalling said tape width and tapering outwardly with respect to each other to a spacing at all other points greater than the tape width, said hub rim being formed with a plurality of slots adjacent said first flange, and the inner surface of said flange being formed with a recess extending outwardly from each of said slots; and a spring means mounted in the reel and extending from within each of said slots outwardly along said recess, each said spring means (1) having a firm nonconforming tape-engaging surface having a coefficient of friction in contact with cellulose acetate greater than about 0.6 and affording an interference of at least 5 mils with a said tape when wrapped on the hub rim, said tape-engaging surface at a point outwardly of the hub rim lying within a said recess and substantially flush with said first flange surface, and said spring being free to be deflected within its slot to a spacing from said second flange surface at least equal to the width of the tape when a said tape is wrapped on the hub rim, and (2) having a supple resiliency affording a resistance of at most about 60 grams to said deflection of the spring.

4. A tape reel that upon rotation in a magnetic tape recorder self-threads magnetic recording tape that is from 0.5 to 1.5 mils in thickness and has a predetermined width, said reel comprising a hub having a cylindrical tape-receiving rim and first and second circular side flanges, the inner surfaces of which are spaced at the hub rim by a distance at least as great as said tape width and at all other points by a distance greater than the tape width, said hub rim being formed with a plurality of slots adjacent said first flange, and the inner surface of said flange being formed with a recess outwardly from each of said slots; and a metal leaf spring extending from within each of said slots outwardly along the inner surface of said first flange and within said recess, each said spring (1) having a thin high-friction covering providing a firm nonconforming tape-engaging surface having a coefficient of friction in contact with cellulose acetate greater than about 0.6 and affording an interference of at least 5 mils with a said tape when wrapped on the hub rim, said tape-engaging surface at a point outwardly of the hub rim lying within a said recess and substantially flush with said first flange surface, and said spring being free to be deflected within its slot to a spacing from said second flange surface at least equal to the width of the tape when a said tape is wrapped on the hub rim, and (2) having a supple resiliency affording a resistance of at most about 60 grams to said deflection of the spring.

References Cited by the Examiner

UNITED STATES PATENTS

| | | | |
|---|---|---|---|
| 1,861,882 | 6/32 | Ross | 242—74.2 |
| 1,861,891 | 6/32 | Wittel | 242—74.2 |
| 1,888,725 | 11/32 | Howell | 242—74 |
| 2,004,608 | 6/35 | Howell | 242—74.2 |
| 3,030,045 | 4/62 | Rehklau | 242—74 |

FOREIGN PATENTS

| | | |
|---|---|---|
| 746,720 | 3/52 | Great Britain. |
| 1,238,912 | 7/60 | France. |

JORDAN FRANKLIN, *Primary Examiner.*